(12) United States Patent
Burgess et al.

(10) Patent No.: US 9,042,870 B2
(45) Date of Patent: May 26, 2015

(54) METHODS FOR CAPACITY LIMITATION MITIGATION IN A RADIO FREQUENCY DEVICE

(75) Inventors: John K. Burgess, Morristown, NJ (US); Donna M. Sand, Redmond, WA (US); Robin J. Thompson, Batavia, IL (US); Ruth Schaefer Gayde, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1014 days.

(21) Appl. No.: 12/591,341

(22) Filed: Nov. 17, 2009

(65) Prior Publication Data

US 2011/0117889 A1    May 19, 2011

(51) Int. Cl.
*H04W 48/06* (2009.01)
*H04W 28/10* (2009.01)
*H04W 36/22* (2009.01)

(52) U.S. Cl.
CPC .............. *H04W 48/06* (2013.01); *H04W 28/10* (2013.01); *H04W 36/22* (2013.01)

(58) Field of Classification Search
CPC ........ H04W 48/06; H04W 4/10; H04W 36/22
USPC .............. 455/456.1, 444, 436, 413, 466, 453, 455/432, 445; 370/328
See application file for complete search history.

(56) References Cited

U.S. PATENT DOCUMENTS

| | | | |
|---|---|---|---|
| 2007/0270152 A1* | 11/2007 | Nylander et al. | 455/445 |
| 2010/0172288 A1* | 7/2010 | Vachhani | 370/328 |
| 2011/0086641 A1* | 4/2011 | Guvenc et al. | 455/437 |

* cited by examiner

*Primary Examiner* — Kumar Patel
*Assistant Examiner* — Kuo Woo
(74) *Attorney, Agent, or Firm* — Harness, Dickey & Pierce, P.L.C.

(57) ABSTRACT

Example embodiments provide a method and/or network element capable of mitigating one or more effects of operating at full capacity. According to an example embodiment, a network element may address load capacity by identifying that a first network element (e.g., a femto) is operating at a threshold capacity. If a communication from a second network element intended for the first network element is received, an operation is performed that informs the second network element of at least one of (i) that the first network element is operating at a threshold capacity and (ii) that the communication cannot be delivered to the first network element while the first network element is operating at a threshold capacity.

20 Claims, 9 Drawing Sheets

METHODS FOR CAPACITY LIMITATION MITIGATION IN A RADIO FREQUENCY DEVICE

BACKGROUND

A femto device (e.g., an access point base station), hereinafter a "femto," may be a miniaturized base station designed to serve a scaled down area. The scaled down area may be a home or a small business. A femto may incorporate a functionality similar to a base station, but with a modification allowing a self contained deployment. The femto may be connected to the Internet via cable, DSL, on-premise fiber optic link, or a similar IP backhaul technology. This connection is used to integrate the femto with a WAN wireless operator's core network.

A femto may serve a geographic area, known as a "femto cell," over a single carrier or channel. A femto cell typically covers a smaller geographic area or subscriber constituency than a conventional macro cell (e.g., a base station cell area). For example, femtos typically provide radio coverage in geographical areas such as one or more buildings or homes, whereas conventional base stations provide radio coverage in larger areas such as an entire cities or towns. The function of a femto is similar to that of a Wireless LAN (Local Area Network), providing the operators a low cost solution for coverage extension and for offloading a mobile station from the cellular network.

A shortcoming of a conventional femto is that there is no communication between the femto and other network elements (e.g., a server) regarding the current capacity at the femto. Instead, a network element must attempt to contact the femto for each event. An event may be a call. For example, if the femto is operating at a maximum and/or full capacity, an incoming call may result in a call failure. Thereafter, the network element has to determine a call treatment for the failed call. The call treatment may be a loss of the call (e.g., redirecting an incoming call to a voice mail system) since capacity is not available at the femto. These call originations and/or failures may continue until resources are available at the femto. This redundant operation results in an inefficient utilization of network resources.

Another shortcoming of a conventional femto is that there is also no communication between a mobile station and the femto regarding the current capacity at the femto. For example, when a mobile station attempts a call via a femto, the call may not go through if the femto is operating at maximum capacity. Furthermore, there is no mechanism to allow the same outgoing call to pass once resources are available at the femto.

SUMMARY OF THE INVENTION

Example embodiments provide a method and/or network element capable of mitigating one or more effects of operating at full capacity.

According to an example embodiment, a network element may address load capacity by identifying that a first network element (e.g., a femto) is operating at a threshold capacity. If a communication from a second network element intended for the first network element is received, an operation is performed that informs the second network element of at least one of (i) that the first network element is operating at a threshold capacity and (ii) that the communication cannot be delivered to the first network element while the first network element is operating at a threshold capacity.

BRIEF DESCRIPTION OF THE DRAWINGS

The accompanying figures are included to provide a further understanding of example embodiments, and are incorporated in and constitute part of this specification. In the figures.

DETAILED DESCRIPTION OF THE EMBODIMENTS

In the following description, for purposes of explanation and not limitation, specific details are set forth such as particular architectures, interfaces, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known devices and/or methods are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description relates to a network based on one or more of CDMA (IS95, cdma2000 and various technology variations), UMTS, GSM, 802.11 and/or related technologies. However, it should be noted that the example embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

As used herein, the term "mobile station" may be synonymous to a mobile user, user equipment (UE), user, subscriber, wireless terminal and/or remote station and may describe a remote user of wireless resources in a wireless communication network. The term "base station" may be understood as a one or more base stations, access points, and/or any terminus of radio frequency communication. Although current network architectures may consider a distinction between mobile/user devices and access points/base stations, the example embodiments described hereafter may generally be applicable to architectures where that distinction is not so clear, such as ad hoc and/or mesh network architectures, for example.

Figure 1:
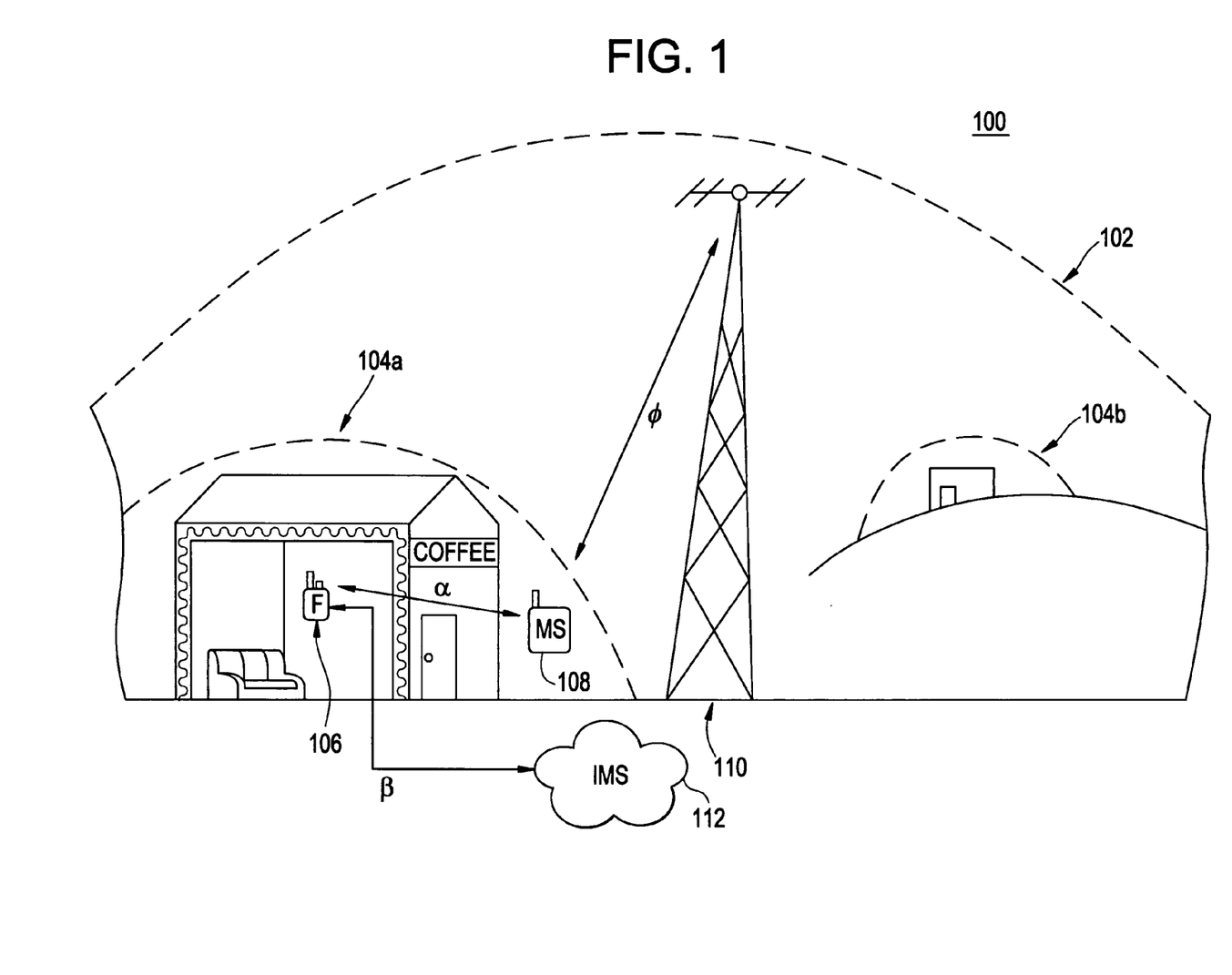
FIG. 1 illustrates a wireless network including a femto according to an example embodiment.

FIG. 1 illustrates wireless network including a femto according to an example embodiment. In FIG. 1, a femto 106 is configured to provide service to a femto cell area 104a. The femto 106 is installed inside a building. In some example embodiments, femto 106 may also be installed outdoors.

A base station 110 provides service to a macro cell area 102. The macro cell area 102 is larger than and encompasses femto cell area 104a. Also, the macro cell area 102 may encompass more than one femto cell area, such as femto cell areas 104a and 104b.

A mobile station 108 may connect to a core network via: i) a macro cell communication link ø associated with base station 110; and/or ii) femto cell communication links α and β associated with the femto 106. In the femto cell communication links α and β, the mobile station connects with the femto 106 via a first communication link α. The first communication link α is a wireless communication link. The femto 106, in turn, connects to Internet Protocol Multimedia Subsystem ("IMS") 112 via a second communication link β. The femto 106 may thereafter interact with the base station 110 via IMS 112, as further explained in FIG. 2. The second communication link β may be a broadband communication link (e.g., cable or DSL modem).

The femto 106 may also serve more than one mobile station. Nevertheless, the femto 106 has a threshold amount of resources that may be allocated to any one mobile station. Therefore, the femto 106 may be caused to operate at a maximum capacity based on the amount of mobile stations receiving service. Also, the type of messages being sent may also cause the femto 106 to operate at its maximum capacity. For example, voice call sessions require more resources than simple text messages.

Figure 2:
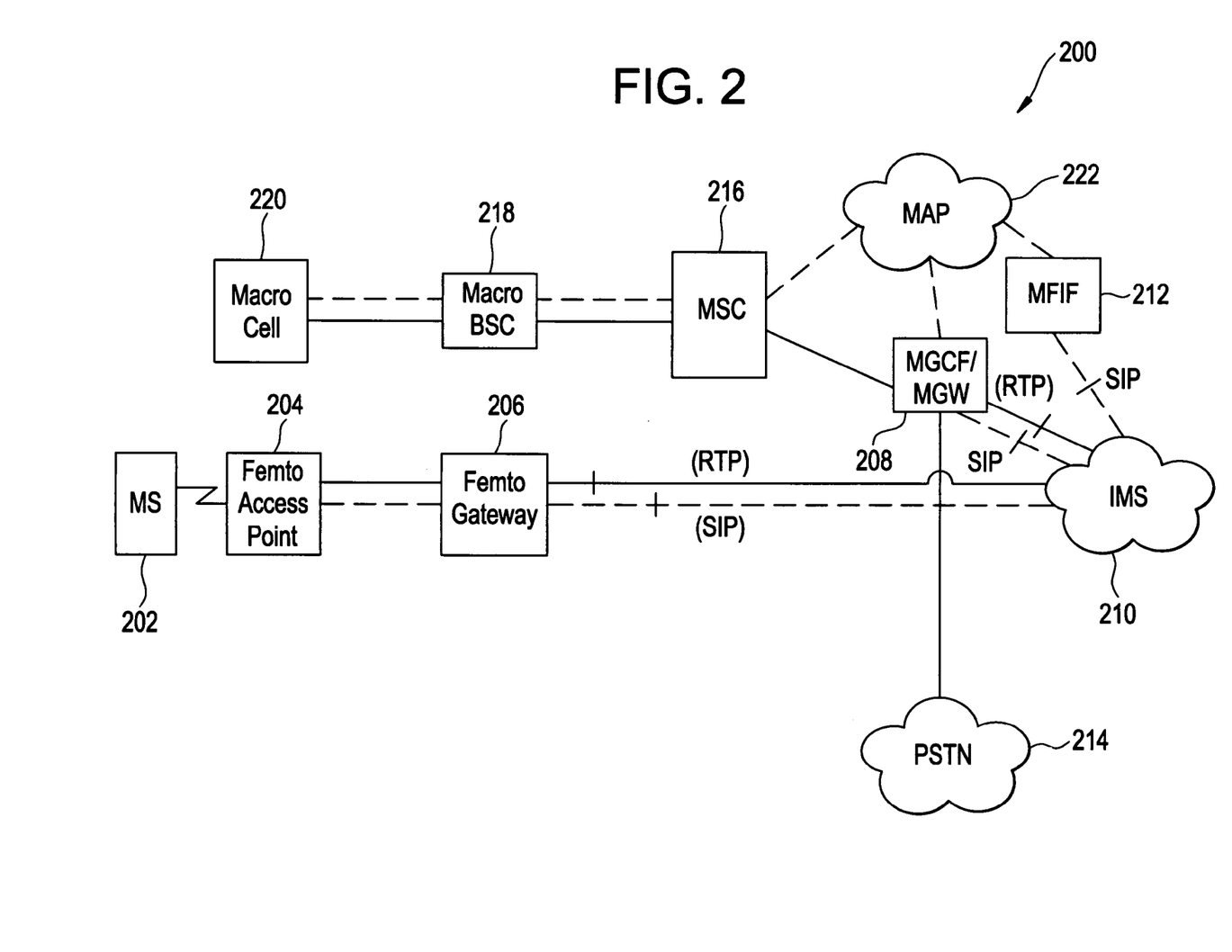
FIG. 2 illustrates a network architecture diagram according to an example embodiment.

FIG. 2 illustrates a network architecture diagram according to an example embodiment. The network architecture diagram incorporates a macro network and a femto network.

Regarding the femto network, a mobile station 202 is configured to communicate with a femto access point 204. The femto access point 204 may include a femto and/or a femto in communication with a base station. Inbound or outbound messages traverse a femto gateway 206. The femto gateway 206 may be configured for establishing a tunnel between the femto 204 and an IMS 210. Further, the femto gateway 206 may be configured for establishing an authentication, authorization, and accounting ("AAA") protocol.

Through the IMS 210, the femto access point 204 may communicate with a MAP-Femto Interworking Function ("MFIF") 212. The MFIF 212 may control and/or influence operation of the femto access point 204. The MFIF 212 communicates with the femto 204 using a session initiation protocol ("SIP"). SIP is a signaling protocol that may be used for controlling multimedia communication sessions such as voice and video calls over Internet Protocol (IP). However, the MFIF 212 may communicate with the femto access point 204 using other types of protocols. The MFIF 212 may be part of a server.

The MFIF 212 is also configured to communicate with a Media Gateway Controller Function ("MGCF"), and/or Media Gateway ("MGW"). The MFIF 212 may communicate with the MGCF/MGW 208 using Mobile Application Part ("MAP") protocol 222. The MAP protocol 222 is an application protocol used to access various databases, registers, and/or network elements.

Regarding the macro network in FIG. 2, the mobile station 202 may also communicate with base station 220. The base station communicates with a macro network base station controller ("BSC") 218. The BSC 218 communicates with a mobile switching controller ("MSC") 216. For the purpose of explanation, the network architecture described in FIG. 2 can be part of the network architecture illustrated in FIG. 1, but not being limited to this Figure. For example base station 110 in FIG. 1 may include Macro Cell 220 and Macro BSC 218 in FIG. 2.

The MSC 216 may be configured to communicate directly, using well-known protocols, with the MGCF/MGW 208. The MSC 216 may also be configured to communicate with the MGCF/MGW 208 using the MAP protocol 222.

The network elements in the femto network and the macro network may communicate with each other. For example, the MSC 216 may communicate with the MFIF 212 using the MAP protocol 222. Also, the femto access point 204 may communicate with the MGCF/MGW 208 over the IMS 210 using SIP.

Once a session is initiated, the MGCF/MGW 208 may establish a high capacity communication with the mobile station 202 over the femto network and/or the macro network. The high capacity communication may be audio and/or video. The MGCF/MGW 208 may use real-time packet transport (RTP) protocol to communicate, with the mobile station 202, audio and/or video originating from: i) another mobile station in the same or similar network (not shown); and/or ii) from a Public/Private Switched Telephone Network ("PSTN") 214.

Figure 3:
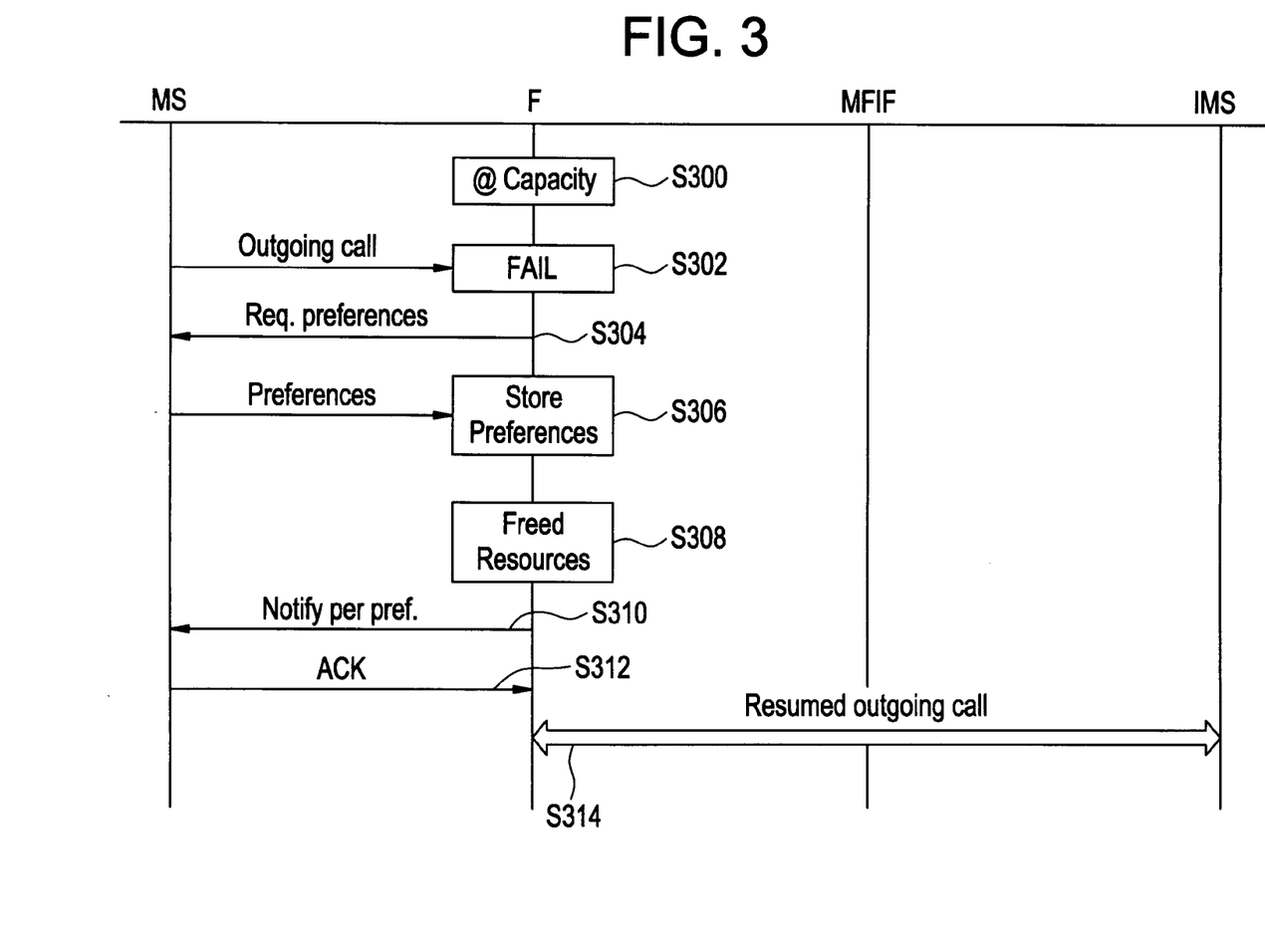
FIG. 3 is a signal flow diagram illustrating a capacity limitation mitigation technique for an outgoing call according to an example embodiment

FIG. 3 is a signal flow diagram illustrating a capacity limitation mitigation technique for an outgoing call according to an example embodiment. An outgoing call is a call originating from a mobile station that is currently receiving service from a femto. In this example embodiment, the femto manages itself. For the purpose of explanation, the method described in FIG. 3 can be implemented in the network architectures illustrated in FIGS. 1 and 2, but not being limited to these Figures. Therefore, reference numerals are not used in FIG. 3.

At step S300, a femto determines that it is operating at a maximum capacity. The femto may make this determination based on the number of mobile stations it is currently serving and/or the type of messages being transmitter over the femto. The femto may independently notify the mobile station that it is operating at a maximum capacity and/or it may wait until the mobile station attempts an outgoing call.

At step S302, the femto receives an outgoing call from a mobile station. As a result of the current load on the femto, the call fails. However, in response the femto sends a message to the mobile station requesting a user's preferences. Along with the request, the femto may also send a message to the mobile station informing it that it is currently operating at a maximum capacity (e.g., an "I_AM_FULL" message). Thereafter, at step S306, the user may either input a preference and/or a mobile station may be pre-programmed to respond with a desired preference, or alternatively a predetermined preference. The user's preferences are stored at the femto.

The user's preferences may include, but are not limited to: (i) a user defined order of importance; and/or (ii) a user defined call label. Regarding (i), the user may be requested to prioritize a call according to importance, such that the femto stores information regarding each attempted communication in a queue according to the user defined order of importance. Regarding (ii), the user may be requested to establish a label for the call.

After a period of time, in step S308, the femto will have freed resources and, thereafter, it will notify the mobile station per the user preferences, per S310. The notification may indicate that that femto currently has the capacity to resume the outgoing call. This may be caused by a drop in the number of mobile stations being served, a release of resources previously allocated to high capacity communications, and/or availability of resources sufficient only to the outgoing call. The notification may be a message to the user (e.g., "Do you still want to talk to User B?") Also, the notification may be based on the above discussed preferences. For example, regarding (i), the femto may send a notification to the mobile station about the freed resources and request the user to acknowledge whether the first queued call should be established. Regarding (ii), the femto may send a notification using the same user defined call label (e.g., "Do you still want to talk to User B about: the client account?").

If the user replies with an acknowledgement ("ACK") to establish the call, as shown in step S312, the femto will resume establishing the outgoing call per S314. The femto resumes the outgoing call with the IMS.

Figure 4A:
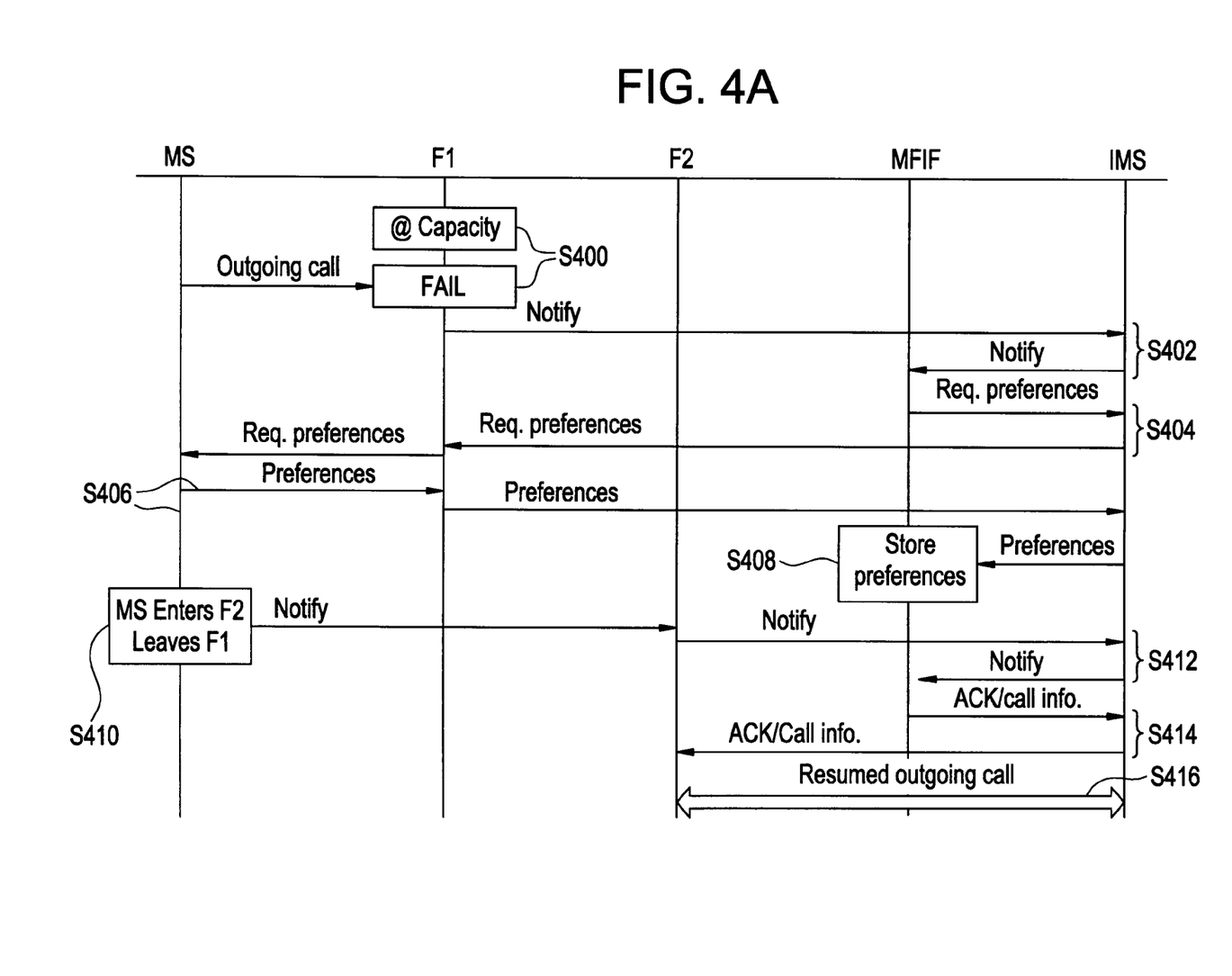
FIGS. 4A and 4B are signal flow diagrams illustrating a capacity limitation mitigation technique for an outgoing call involving more than one femto, according to further example embodiments.
Figure 4B:
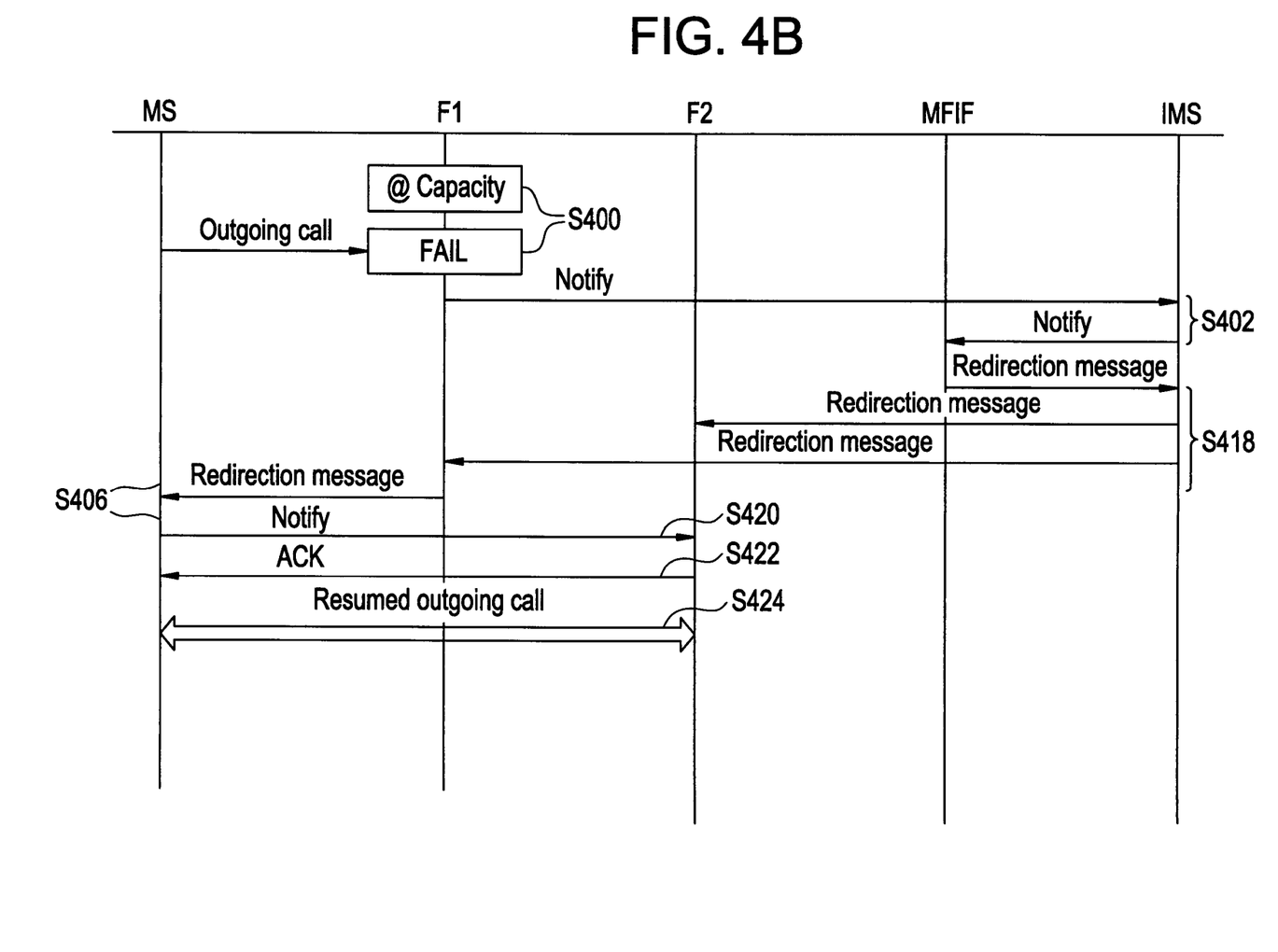

FIGS. 4A and 4B are signal flow diagrams illustrating a capacity limitation mitigation technique for an outgoing call involving more than one femto, according to further example embodiments. For the purpose of explanation, the method described in FIGS. 4A and 4B can be implemented in the network architectures illustrated in FIGS. 1 and 2, but not being limited to these Figures. Therefore, reference numerals are not used in FIGS. 4A and 4B.

FIG. 4A is a signal flow diagram illustrating a capacity limitation mitigation technique for an outgoing call if a mobile station's call passes from a first femto ("F1") to a second femto ("F2") according to an example embodiment. In FIG. 4A, a first femto cell corresponding to the F1 may not overlap with a second femto cell corresponding to the F2. In this example embodiment, the femtos are managed by the MFIF. Generally, the MFIF may operate in a similar manner as the femto in FIG. 3.

In step S400, the F1 determines that it is operating at a maximum capacity, such that an outgoing call from a mobile station fails once it is received at the F1 operating at maximum capacity.

In response to the failed call, in step S402 the F1 sends a message to the MFIF notifying it of the failed call. Communications between F1 and the MFIF first have to travel through the IMS. Upon receiving the notification, in step S404 the MFIF may instruct the F1 to request user preferences. Once the F1 receives such instructions, it sends a request for user preferences to the mobile station. The preferences may be the same as those discussed in relation to FIG. 3.

In step S406, the preferences are communicated from the mobile station to the F1, and thereafter forwarded to the MFIF. The preferences are then stored by the MFIF in step S408.

The MFIF managed femtos permit a mobile station to travel to different femtos and preserve a user's preferences. For example, in step S410, the mobile station leaves the femto cell of the F1 and enters the femto cell of F2. In step 412, the mobile station notifies the F2 that the mobile station currently in its femto cell in order for the F2 to provide wireless service. This notification may also include configuration communications between the F2 and the mobile station. Unlike the F1, the F2 is not operating at maximum capacity. Also, since the F2 may also be managed by the MFIF, it also forwards the notification to the MFIF.

Since the MFIF previously stored the user preferences associated with the mobile station, in step S414 the MFIF will send an ACK that the F2 is now servicing the mobile station and will also forward the outgoing call information to the F2. Once the F2 receives the user preferences, the F2 may notify the mobile station per the stored user preferences (not shown). Alternatively, the F2 may just resume the outgoing call without any further preliminary interaction with mobile station, as shown in step S416.

FIG. 4B is a signal flow diagram illustrating a capacity limitation mitigation technique for an outgoing call if the F1 and the F2 have overlapping femto cells, according to another example embodiment. Since the first femto cell corresponding to the F1 overlaps with the second femto cell corresponding to the F2, the mobile station may be redirected from the F1 to the F2 if the F1 is operating at the maximum capacity. The F1 and the F2 may belong to the same or a different carrier. The signal flow diagram illustrated in FIG. 4B may also be adjusted for an incoming call intended for the mobile station.

In FIG. 4B, after the F1 notifies the MFIF that the F1 is operating at capacity and that an outgoing call has failed (steps S400 and S402), the MFIF may send a redirection message to the F2 and the F1, per step S418. The redirection message may include configuration information corresponding to the mobile station and/or the F2. The MFIF may be pre-configured to know the configuration information corresponding to the mobile station and/or the F2. Also, the MFIF may have previously received a communication from the F2 informing the MFIF that the F2 was not operating at a maximum capacity and/or had available resources to permit a call to be redirected. Also, in an alternate embodiment, the steps performed at the MFIF may be performed between the F1 and the F2, such that the two femtos are aware of a load of the presence of overlapping femtos (e.g., partner femtos) and the load on each of the overlapping femtos.

Returning to FIG. 4B, the F1 forwards the redirection message to the mobile station. In step S420, upon receipt of the redirection message the mobile station may send a notification to the F2 to verify redirection of the outgoing call. If the F2 sends an ACK as shown in step S422, the outgoing call may be resumed with the F2, per step S424.

Figure 5A:
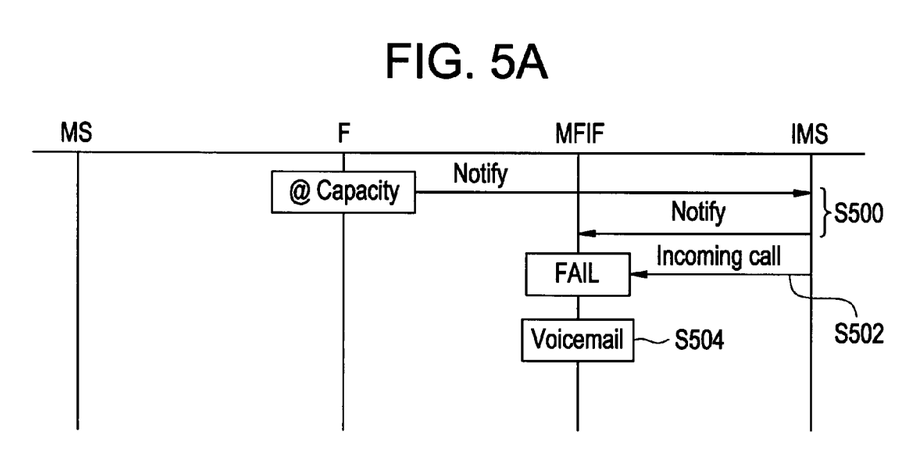
FIGS. 5A-5C are signal flow diagrams illustrating a capacity limitation mitigation technique for an incoming call according to various example embodiments.
Figure 5B:
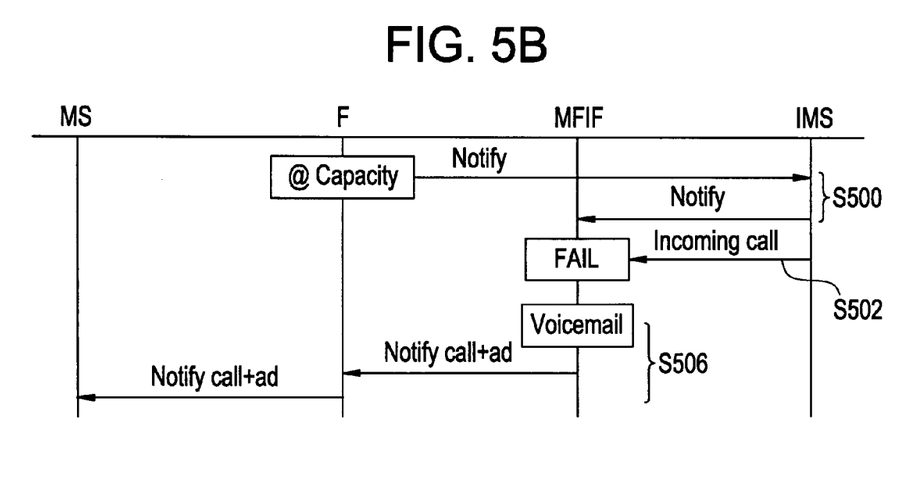
Figure 5C:
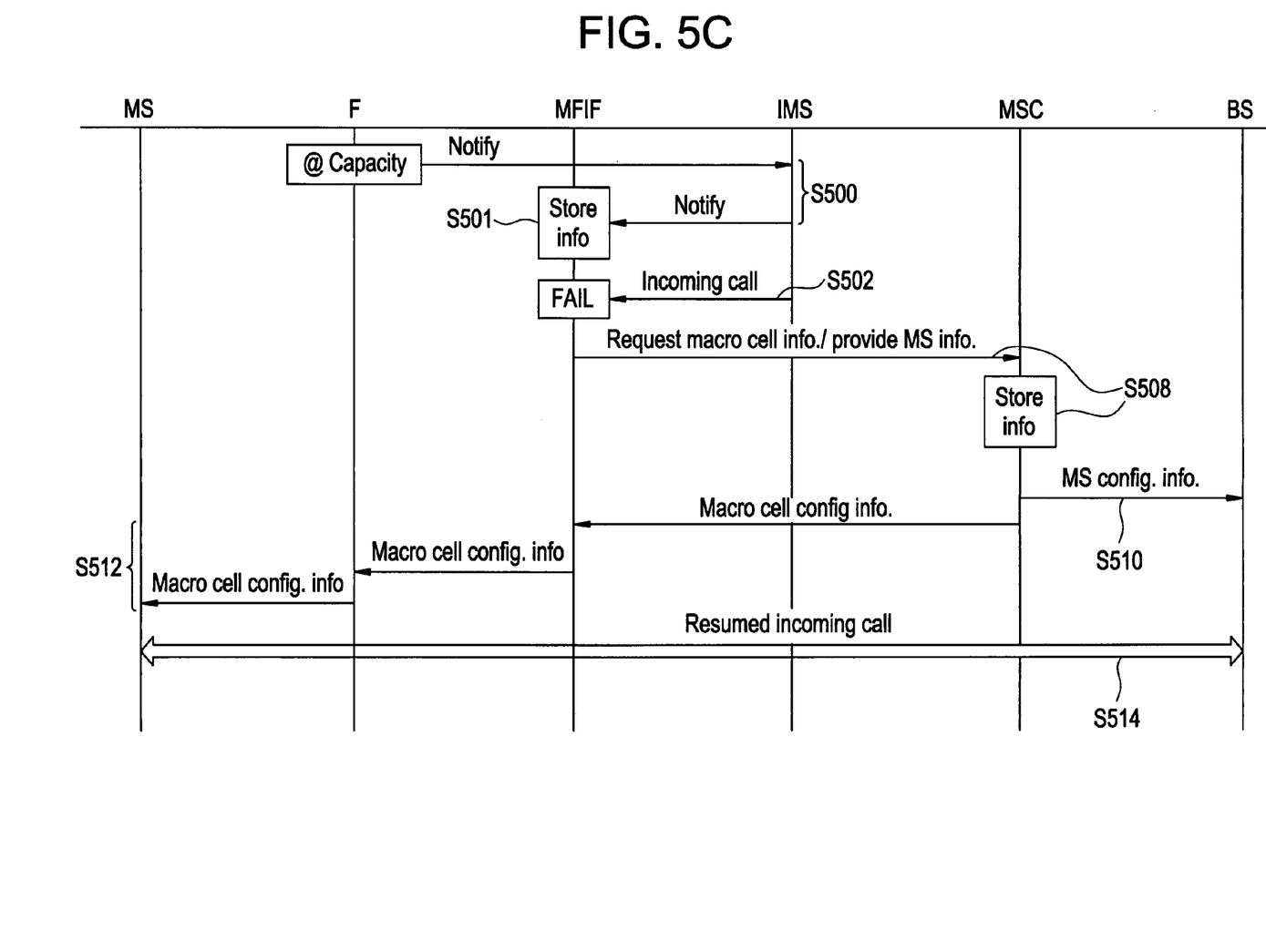

FIGS. 5A-5C are signal flow diagrams illustrating a capacity limitation mitigation technique for an incoming call according to various example embodiments. An incoming call is a call intended for a mobile station receiving service from a femto. For the purpose of explanation, the methods described in FIGS. 5A-5C can be implemented in the network architectures illustrated in FIGS. 1 and 2, but not being limited to these Figures. Therefore, reference numerals are not used in FIG. 5A-5C.

In FIG. 5A, a femto operating at maximum capacity may send a notification to the MFIF, as shown in step S500. The MFIF then receives an incoming call that is intended for the mobile station receiving service from the femto in step S502. The MFIF, being aware that the femto is operating at a maximum capacity, refrains from delivering the incoming call to the femto. In this manner, resources at the femto are preserved. Also, the MFIF may initiate a voicemail operation in which the user sending the failed incoming call may leave a message, as shown in step 504.

In another example embodiment, after activating the voicemail operation, the MFIF sends a message to the mobile station notifying the mobile station user that an incoming call may not be delivered, as shown in step S506 in FIG. 5B. The notification may include an advertisement regarding femto capacity (e.g., "Buy more femto capacity"). If the user responds to the advertisement in a desired manner, the femto may be allocated a greater capacity of resources automatically and/or at the direction of the femto subscriber.

In another example embodiment, an incoming call may be established in the macro cell once it fails to be delivered to the femto. This is possible since the macro cell overlaps the femto cell, as discussed in regards to FIG. 1. Also, the MSC corresponding to the macro cell may be registered with the femto and/or MFIF prior to the handover request taking place. In FIG. 5C, the MFIF may store information about the femto once it is notified that the femto is operating at maximum capacity, as shown in step S501. Thus, after the MFIF refrains from delivering the incoming call, the MFIF in step S508 may send a request for macro cell information to the MSC. The request for information may also include configuration information about the mobile station such that the MSC stores the mobile station configuration information. The MSC then sends the mobile station configuration information to a macro cell base station in step S510 and sends macro cell configuration information to the mobile station via the MFIF and the femto in step S512. Upon receipt of the configuration information, the incoming call may be resumed between the mobile station and the base station, as shown in step S514.

Figure 6A:
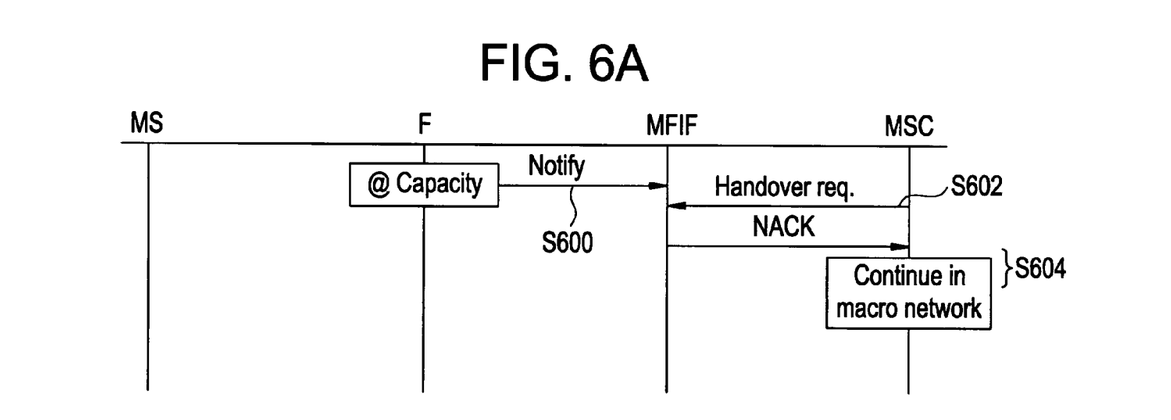
FIGS. 6A-6C are signal flow diagrams illustrating a capacity limitation mitigation technique for call handovers from a macro cell to a femto cell according to various example embodiments.
Figure 6B:
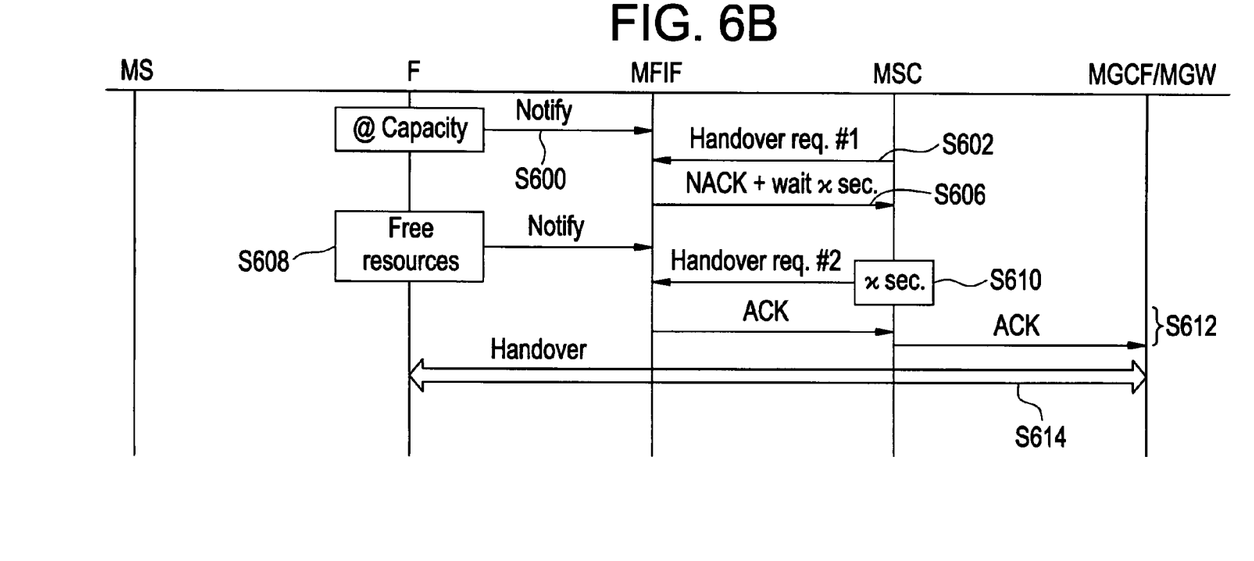
Figure 6C:
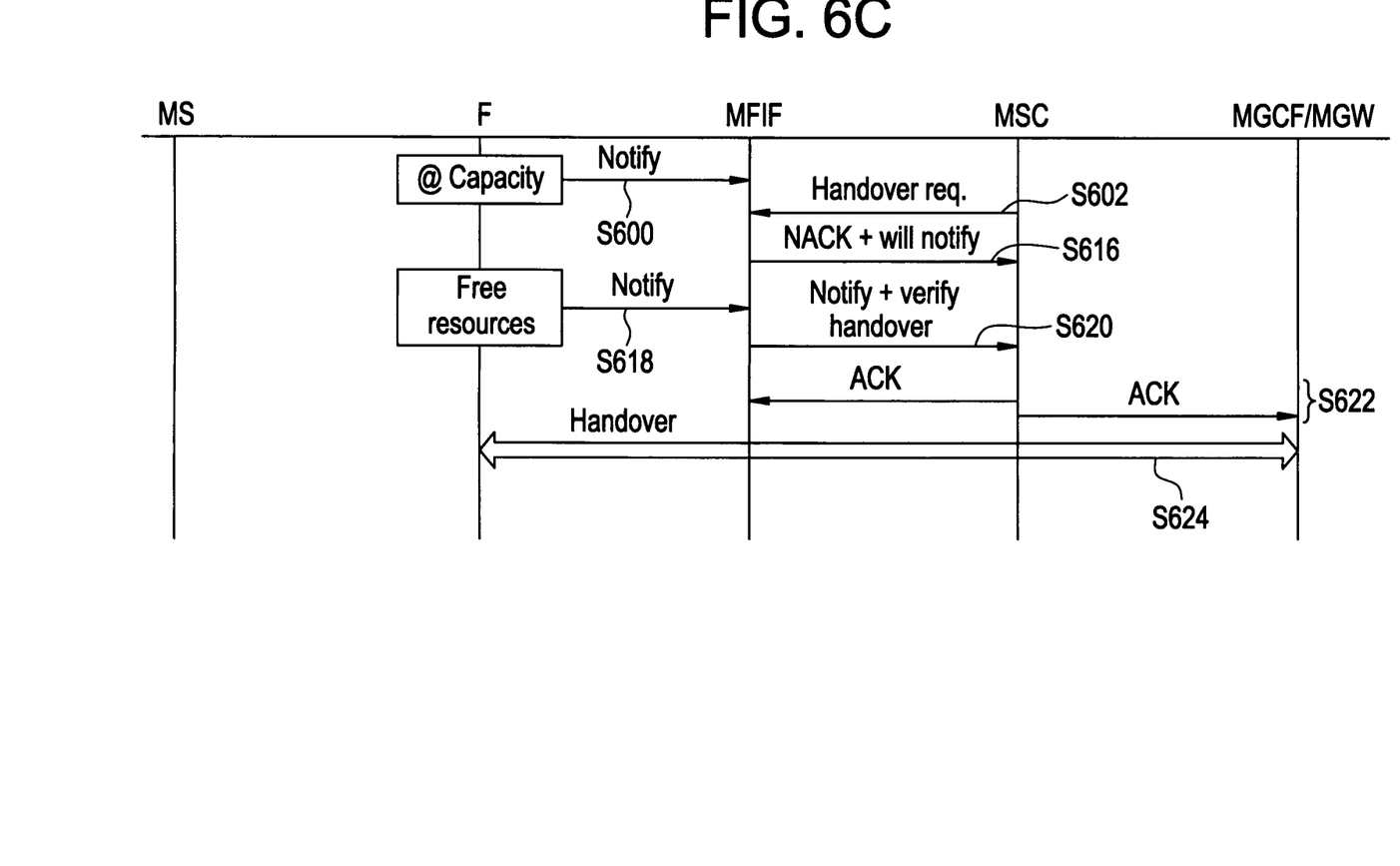

FIGS. 6A-6C are signal flow diagrams illustrating a capacity limitation mitigation technique for call handovers from a macro cell to a femto cell according to various example embodiments. For the purpose of explanation, the methods described in FIGS. 6A-6C can be implemented in the network architectures illustrated in FIGS. 1 and 2, but not being limited to these Figures. Therefore, reference numerals are not used in FIGS. 6A-6C.

In FIG. 6A, a femto operating at maximum capacity notifies the MFIF, as shown in step S600. Thereafter, in step S602 the MFIF receives a handover request from the MSC. The handover request may be from a mobile station receiving service from the MSC. Since MFIF is aware that the femto is operating at maximum capacity, in step S604 the MFIF sends a non-acknowledgement ("NACK") message to the MSC. The call may then continue in the macro cell.

Alternatively, in response to receiving the handover request, the MFIF may send a NACK message along with an instruction to the MSC to wait a desired, or alternatively predetermined, amount of time (e.g., "wait x seconds"), as shown in step S606 of FIG. 6B. The purpose of the wait instruction is to allow the femto a period of time ("x") to notify the MFIF if it has freed resources since the previous notification. For example, in step S608 the femto has freed resources and notifies the MFIF within the desired time interval x. After the desired time interval x has expired, in step S610 the MSC sends a second handover request. Since the MFIF is aware that the femto has resources available to allow the handover, the MFIF sends an ACK to the MSC, which is thereafter forwarded to the MGCF/MGW, as shown in step S612. As a result, a successful handover may take place between the MGCF/MGW and the femto, as shown in step S614, such that a call previously being in the macro cell is now in the femto cell.

If, however, after the desired time interval x has expired the femto still does not have resource available, the MFIF may: i) send the MSC a NACK and a request to wait an additional period of time; or ii) send the MSC a NACK such that the MSC determines whether to try again or refrain from making any further handover attempts.

Nevertheless, an additional alternative to the above discussed example embodiment is shown in FIG. 6C. In response to receiving the handover request, the MFIF may send a NACK message along with an instruction to the MSC that the MFIF will notify the MSC whenever it becomes aware that the femto has available resources, as shown in step S616. In step S618, the femto notifies the MFIF that resources are free. In response, in step S620 the MFIF notifies the MSC that the femto has available resources and requests that the MSC verify whether it still wants to engage in the handover.

If the MSC, and/or other network element, still wants to continue with the handover, an ACK is sent to both the MFIF and the MGCF/MGW in step S622. In step S624, successful handover may take place between the MGCF/MGW and the femto.

The example embodiments being thus described, it will be obvious that the same may be varied in many ways. Such variations are not to be regarded as a departure from the disclosed subject matter, and all such modifications are intended to be included within the scope of the disclosed subject matter.

We claim:

1. A method for addressing load capacity, comprising:
   identifying that a first network element is operating at a threshold capacity;
   receiving a communication from a second network element, the communication intended for the first network element;
   performing an operation that informs the second network element at least one of (i) that the first network element is operating at a threshold capacity and (ii) that the communication cannot be delivered to the first network element while the first network element is operating at the threshold capacity, the operation including
   requesting the second network element to provide user preferences such that the second network element is informed that the first network element is operating at the threshold capacity upon receiving the request, and
   receiving the user preferences from the second network element such that the user preferences are stored at the first network element, the user preferences being input to the second network element by a user of the second network element;
   sending, if the first network element changes from operating at the threshold capacity to operating at below the threshold capacity, a notification to the second network element that the communication is deliverable via the first network element; and
   delivering, by the first network element, the communication if the second network element acknowledges the notification.

2. The method of claim 1, wherein the identifying step is performed by the first network element.

3. The method of claim 2, wherein the first network element is a Femto unit.

4. The method of claim 1, wherein the identifying step is performed by a third network element, such that the identifying step includes,
   receiving, from the first network element, the notification indicating that the first network element is operating at the threshold capacity.

5. The method of claim 4, wherein third network element is a server.

6. The method of claim 1, wherein the second network element is a mobile station and the communication is a message originating from the mobile station.

7. The method of claim 1, wherein the communication is a message traveling through an IP multimedia subsystem.

8. The method of claim 1, the performing step further including,
   adding the communication to a queue according to a user defined order of importance in the user preferences, wherein
   the sending step is performed based on a position of the communication in the queue.

9. The method of claim 1, wherein the sending step sends the notification along with an associated user defined call label included in the user preferences.

10. The method of claim 1, wherein the second network element is a mobile station, the first network element is a first Femto unit, and the performing step further includes,
   receiving, at a third network element, a notification from a second Femto unit that the mobile station is disassociated with the first Femto unit and is dedicated to the second Femto unit, and
   sending an acknowledgement message to the second Femto unit, the acknowledgement message including information related to the communication, such that the communication is delivered through a link between the second Femto unit and the mobile station.

11. The method of claim 1, wherein the first network element is a first Femto unit, and the performing step further includes,
   sending a redirection message to at least one of the second network element, the first Femto unit, and a second Femto unit, such that the communication is delivered through a link between the second Femto unit and the second network element.

12. The method of claim 1, wherein the performing step includes,
   performing a voicemail operation if the first network element is operating at the threshold capacity, such that the second network element is informed that the first network element is operating at a threshold capacity.

13. The method of claim 1, wherein the performing step includes,
   sending to the second network element (i) a notification that the communication from the first network element cannot be delivered while the first network element is operating at the threshold capacity, and (ii) a request for more network resources.

14. The method of claim 13, wherein the request for more network resources is an advertisement.

15. The method of claim 1, wherein the performing step includes,
   sending to a macro-cell network element a request for a handover, the request including (i) a request for macro-cell configuration information and (ii) configuration information of the first network element.

16. The method of claim 15, the method further comprising:
   receiving the macro-cell configuration information, the macro-cell configuration information being associated with a macro-cell radio frequency device; and
   sending, to the first network element, the macro-cell configuration information such that the communication may be delivered to the second network element over the macro-cell radio frequency device.

17. The method of claim 1, wherein the communication is a handover request and the second network element is a macro-cell network element, such that the performing step includes,
   sending a non-acknowledgement message to the macro-cell network element.

18. The method of claim 17, wherein the non-acknowledgement message includes a request to resend the handover request after a period of time, the method further comprising:
   receiving the resent handover request after the period of time; and
   sending an acknowledgement for the handover request if a determination that the first network element is operating at least one of (i) below the threshold capacity and (ii) with available resources was made during the period of time.

19. The method of claim 17, wherein the sending a non-acknowledgement message includes a message that the macro-cell network element will be notified if the first network element has resources available, the method further comprising:
   sending a request to verify the handover request; and
   receiving an acknowledgement for the handover request.

20. The method of claim 1, wherein the operation includes requesting the user of the second network element to at least one of, i) prioritize the communication such that the first network element stores information about the communication in a queue according to a user defined order importance, and ii) establish a label for the communication.

* * * * *